(No Model.)

C. G. BEECHEY.
GAS REGULATING VALVE FOR GAS ENGINES.

No. 306,314. Patented Oct. 7, 1884.

WITNESSES:
E. B. Bolton
Geo. H. Fraser

INVENTOR:
Charles G. Beechey,
By his Attorneys,
Bunty Fraser Bonnett

UNITED STATES PATENT OFFICE.

CHARLES GRANTLEY BEECHEY, OF LIVERPOOL, ENGLAND.

GAS-REGULATING VALVE FOR GAS-ENGINES.

SPECIFICATION forming part of Letters Patent No. 306,314, dated October 7, 1884.

Application filed September 8, 1883. (No model.) Patented in England February 17, 1883, No. 892, and in France March 5, 1883, No. 154,103.

*To all whom it may concern:*

Be it known that I, CHARLES GRANTLEY BEECHEY, of Liverpool, England, engineer, have invented an Improved Apparatus for Gas-Regulating Valves for Gas-Engines, of which the following is a specification.

Gas-engines when at work cause a fluctuation or variation of pressure in the gas mains or pipes, which produces a highly objectionable unsteadiness in the gas-flames supplied therefrom. This fluctuation is due to the fact that gas-engines draw in their supply of gas intermittently and irregularly, thus causing alternate and irregular rarefactions and compressions of gas in the main. In order to lessen these fluctuations, an india-rubber bag or gas-holder is commonly interposed between the main and the engine, which may fill with gas during the interval when the engine is not drawing in a charge, and be emptied by the indraft from the engine. There still remains, however, a considerable fluctuation in the mains or pipes due to the repeated inflation or expansion and recoil or contraction of the rubber bag, and this fluctuation it is the object of the present invention to prevent. For this purpose I provide on the gas main or pipe leading to the said rubber bag, and from which the engine is supplied, an inlet-valve the extent of opening of which is controlled by automatic means to prevent fluctuation, as I will proceed to describe, referring for that purpose to the accompanying drawings, wherein—

Figure 1:
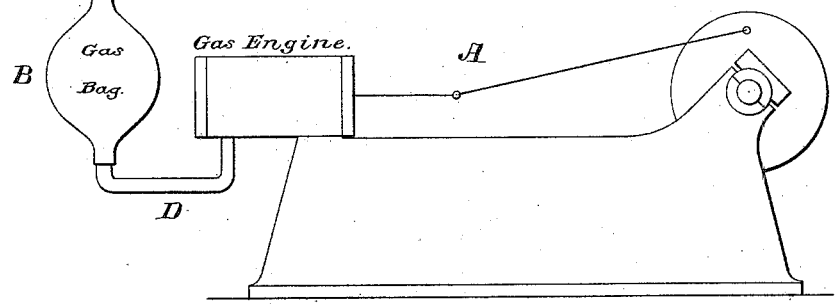
Figure 2:
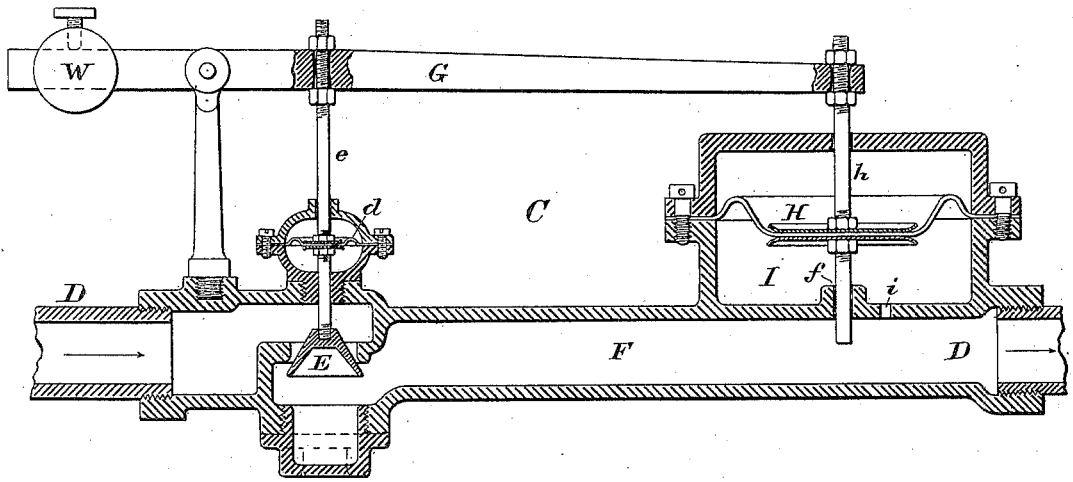

Figure 1 is a diagrammatic elevation of a gas-engine, rubber bag, and my anti-fluctuating valve; and Fig. 2 is a vertical longitudinal section of the valve alone on a larger scale.

Let A designate the gas-engine; B, the india-rubber gas-bag; C, the anti-fluctuator gas-inlet valve, and D D the gas-main or supply-pipe. The gas-engine A may be of any desired kind, and for the gas-bag B may be substituted any equivalent device, such as a gas-holder. The anti-fluctuator valve C consists of a throttle-valve, E, in the gas-pipe D, and means for controlling it so that it shall gradually open and close according to the varying quantities of gas used at different times. The gas flowing through the main is reduced in pressure upon passing this valve, and its tendency is to throw the valve wider open. The pressure in the portion F of the gas-pipe between the valve and the engine is constantly varying or fluctuating, and if the valve E were freely or elastically hung, it would be alternately opened wider and partially closed by the successive pulsations of pressure, which pulsations would thus be communicated to the gas in the main D which has not yet passed the valve. Any such communication of fluctuations of pressure through the valve must be prevented to accomplish the aim of my invention, and yet the valve must be made to automatically open wider or partially close, according as the demand of the engine for gas increases or diminishes, according to the varying work that the engine has to perform at different times. This result I accomplish by mounting the valve E on a stem, $e$, and connecting this stem to a lever, G, while to the extremity of this lever, farther from the fulcrum thereof, is attached the stem $h$ of a flexible diaphragm, H, which works in a closed chamber, I. This chamber I is in communication on one side of or below the diaphragm with the interior of the portion F of the gas-pipe D through a small hole, $i$, or, in lieu thereof, through a clearance-space around the stem $h$, as seen at $f$. The space above the diaphragm is in communication with the outer air.

It is obvious that in order to move the valve E a certain distance the diaphragm H must be moved a much greater distance, depending upon the proportions of the lever G. With the proportion shown the diaphragm must move about six times as far as the valve; hence any fluctuation of pressure in the space F tending to open or close the valve will be resisted by the diaphragm with a great advantage of leverage until such time as enough gas can flow through the hole $i$ to permit of a sufficient movement of the diaphragm. In the case of fluctuations of pressure the pulsation will have terminated before the diaphragm can have commenced to move, and consequently the valve will remain stationary; but in the case of a continued difference between the average pressure in the space F and the pressure on the opposite side of the valve, the diaphragm will be moved and the valve opened or closed enough to compensate for the difference in pressure. If the chamber I had free or full communication with the space F, the constant variations of pressure in this space would cause the diaphragm to be constantly acted on and moved a considerable distance at each pulsation; but as the only communication is the small hole $i$, the pressure upon the diaphragm is practically constant, or, more correctly speaking, it is at the average between the maximum and minimum pressures in the space F. Thus the valve E is left open to a uniform degree, (proportioned always to the amount of gas required by the engine,) and a uniform stream of gas flows past it. The area of the hole $i$ or of the clearance-space $j$ should be about one four-thousandth part of the area of the diaphragm H.

In order to be able to adjust the device, I place a weight, W, on the opposite arm of the lever G, which weight may be set to different positions on the arm.

The valve-stem $e$, where it passes out of the casing, is provided with a frictionless leather seal or diaphragm, $d$, to prevent escape of gas around it.

Prior to my invention gas-regulators have been made wherein the movements of the inlet-valve are controlled by means of a diaphragm placed in a closed chamber, which communicates with the pipe beyond the valve through a small hole or opening; but in all such devices, so far as I am aware, the valve and diaphragm have both been connected to the same stem, so that the diaphragm necessarily moves to the same extent as the valve. These devices, while well adapted to the purposes for which they are designed—namely, to counteract inequalities of pressure in the main or supply pipe and thus deliver the gas to the burners of a building at a uniform pressure—are nevertheless incapable of performing the service for which my present invention is designed, for the reason that the greatly varying pressures caused by the gas-engine impart to the valve sudden and considerable tendencies to move farther open or farther closed, which tendencies a diaphragm that participates in the same extent of movement as the valve is inadequate to counteract. By my invention, however, the interposition of the multiplying-lever overcomes this difficulty, since the valve must move the diaphragm about six times (more or less according to length of lever) as far as its own movement, so that the force tending to move the diaphragm is at a considerable disadvantage and is impotent to effect any sudden or extended movement of the diaphragm. This disadvantage of leverage, coupled with the placing of the diaphragm in a closed chamber having only a counteracted communication with the pipe, is what renders my improved regulator operative for the special purpose for which it was designed.

It is obvious that in place of the diaphragm H some equivalent device, such as a floating holder, might be used.

I claim as my invention—

1. The combination, with a gas-engine and its gas-supply pipe, of a regulating-valve in said pipe, said valve consisting, essentially, of a throttle-valve, a closed chamber communicating through a small orifice with the gas-supply pipe, between said throttle-valve and the engine, a flexible diaphragm in said chamber, and the connection between said diaphragm and throttle-valve, whereby a movement of the latter shall necessitate a much more extended movement of the former, substantially as and to the effect set forth.

2. In a regulating-valve for gas-pipes from which gas-engines are supplied, the combination of throttle-valve E, its stem $e$, lever G, connected to said stem near its fulcrum, diaphragm H, its stem $h$, connected to said lever G remote from its fulcrum, and closed chamber I, having a small orifice communicating with the gas-passage on the eduction side of the throttle-valve, substantially as set forth.

In witness whereof I have hereunto signed my name in the presence of two subscribing witnesses.

CHARLES GRANTLEY BEECHEY.

Witnesses:
TOM MACKRETH,
JOHN R. WATKINS.